Jan. 9, 1945.  H. A. BURGGRABE  2,366,955
REFRIGERATION
Filed Sept. 20, 1941
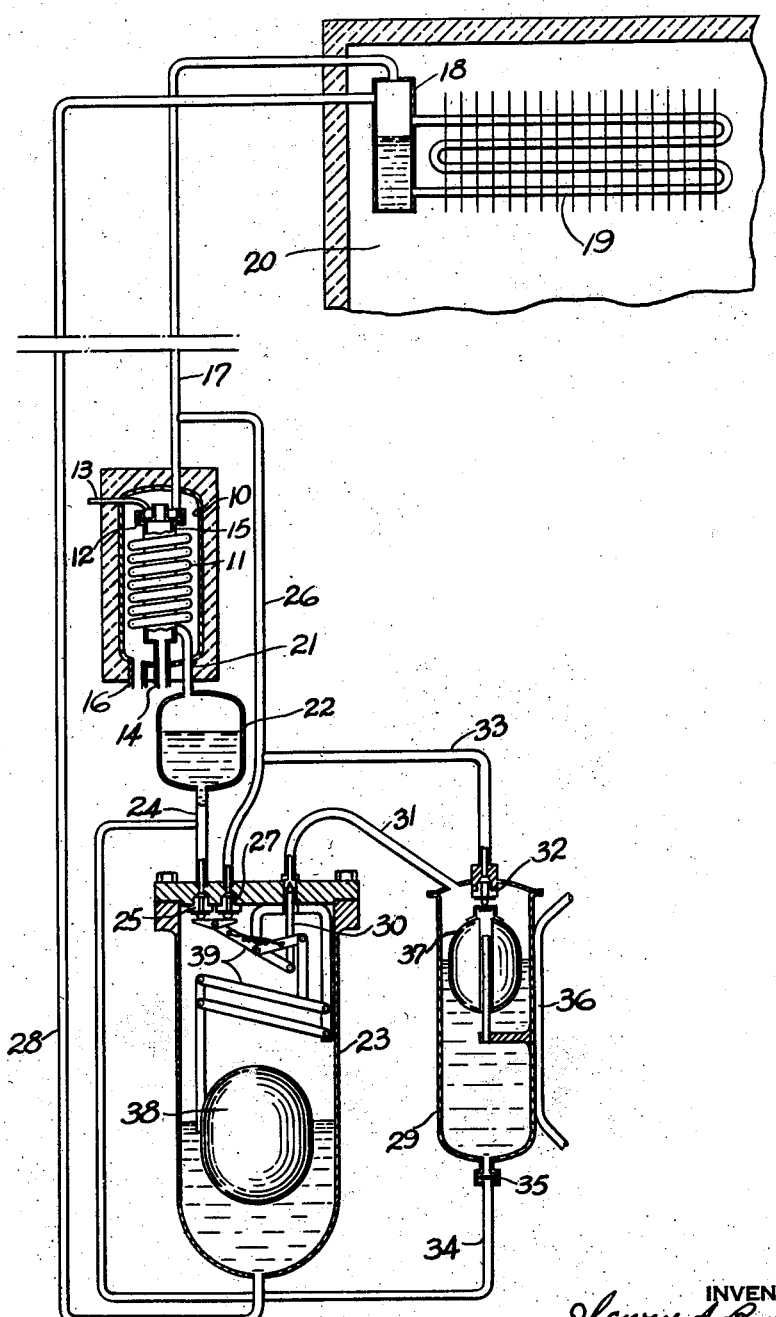
INVENTOR
Henry A. Burggrabe
BY
D. E. Heath
his ATTORNEY Patented Jan. 9, 1945

2,366,955

UNITED STATES PATENT OFFICE 2,366,955

REFRIGERATION

Henry A. Burggrabe, Evansville, Ind., assignor to Servel, Inc., New York, N. Y., a corporation of Delaware Application September 20, 1941, Serial No. 411,604

3 Claims. (Cl. 62—125)

My invention relates to refrigeration and more particularly to transfer of a refrigerating effect from a place where it is produced to a place where it is to be used at a higher elevation.

It is an object of the invention to carry out such heat transfer by employing a vaporization-condensation circuit in which liquid is raised from a lower elevation to a higher elevation by lift action of vapor conservatively produced.

The single figure of the drawing shows more or less diagrammatically a heat transfer system embodying the invention.

At a lower elevation, such as in the basement of a store, there is located refrigeration apparatus including an evaporator or cooling element 10. The evaporator 10 is a part of a refrigerating apparatus like that shown and described in Patent No. 2,207,836 of A. R. Thomas to which reference may be had for explanation of operation of the system. The disclosure of said patent is hereby incorporated in the present specification. The evaporator 10 contains a pipe coil 11. Above pipe coil 11 is a liquid distributor 12. An inlet conduit 13 is arranged to direct liquid refrigerant into distributor 12. The liquid refrigerant is deposited by distributor 12 onto coil 11. The liquid descends over the outside of coil 11, evaporating and diffusing into an auxiliary pressure equalizing fluid such as hydrogen. The evaporation of liquid on the outside of tube 11 produces cooling of fluid within the tube. Hydrogen enters evaporator 10 through a conduit 14 and flows to the top of the evaporator through a central pipe 15. The mixture of refrigerant vapor and inert gas leaves the bottom of evaporator 10 through a conduit 16.

The upper end of evaporator coil 11 is connected by a conduit 17 to a header 18. A finned heat transfer coil 19 is connected to header 18, and together therewith forms a second evaporator or cooling element. The evaporator 19 is located in an insulated refrigerator storage compartment 20 which may be a display case or walk-in cooler or the like on an upper floor of the store. The lower end of evaporator coil 11 is connected by a conduit 21 to the top of a vessel 22. Below vessel 22 there is a transfer vessel 23. The bottom of vessel 22 is connected by a conduit 24 to an inlet opening in the top of transfer vessel 23 controlled by a valve 25. The upper end of evaporator coil 11 is connected by a part of conduit 17 and a conduit 26 to another opening in the top of transfer vessel 23 controlled by a valve 27. The bottom of transfer vessel 23 is connected by a conduit 28 to the header 18 in the refrigerator 20.

Alongside of transfer vessel 23 there is a pressure vessel 29. An opening in the top of transfer vessel 23 controlled by a valve 30 is connected by a conduit 31 to the top of pressure vessel 29. An opening in the top of vessel 29 controlled by a valve 32 is connected by a conduit 33 to conduit 26. The bottom of vessel 29 is connected by a conduit 34 to conduit 24. Between conduit 34 and the bottom of vessel 29 is connected a check valve 35. Check valve 35 permits flow of liquid only in the direction from conduit 34 into vessel 29. Vessel 29 is in heat exchange relation with a heating element 36 which may be, for instance, the outlet conduit for cooling water from the refrigeration apparatus.

Valve 32 in pressure vessel 29 is operated by a float 37 so that valve 32 is held closed when float 37 is buoyed upward by liquid in vessel 29. Valves 25 and 27 and 30 are operated by a float 38 through a snap action lever mechanism 39. The lever mechanism 39 is constructed as shown so that when the float 38 is up, valves 25 and 27 are closed and valve 30 is open, and when float 38 is down, valve 30 is closed and valves 25 and 27 are open.

The above described system of conduits and vessels is charged with a volatile heat transfer fluid which may be, for instance, methyl chloride. When the refrigeration apparatus is operated as described in said Thomas patent, cooling of evaporator coil 11 takes place. As a result of this cooling, vapor of methyl chloride or other heat transfer fluid is condensed to liquid in coil 11. Therefore, from the standpoint of heat transfer circuit, coil 11 is a condenser. Condensation of vapor in coil 11 causes a lowering of pressure in the circuit so that the liquid refrigerant vaporizes in the evaporator coil 19 to produce cooling of refrigerator compartment 20. Vapor produced by evaporation of liquid in the evaporator coil 19 flows from the evaporator header 18 through conduit 17 to the condenser 11.

Liquid condensate formed in condenser 11 flows from the bottom end of this coil through conduit 21 into the accumulation vessel 22. Assuming that float 38 is down so that valves 25 and 27 are open, liquid flows from vessel 22 through conduit 24 into transfer vessel 23. During flow of liquid into transfer vessel 23, which may be generally referred to as a filling period, the pressure in vessel 23 is equalized with the pressure in the rest of the system through opening valve 27 and conduit 26. During this time, valve 30 is closed so that transfer vessel 23 is cut off from the pressure vessel 29. Liquid rises in vessel 23 and raises float 38 until the snap action leverage is operated to open valve 30 and close valves 25 and 27. Thereupon vessel 23 is connected to vessel 29 by way of conduit 31. Vessel 29 is supplied with liquid from accumulation vessel 22 by way of conduit 24 and conduit 34. Vessel 29 is filled with liquid to such a level that float 37 closes valve 32. Since conduit 36 contains water which has been heated by the refrigeration apparatus, liquid in vessel 29 is maintained at such a temperature that its vapor in the upper part of vessel 29 and conduit 31 is maintained at a high pressure. When this high pressure is in existence, valve 32 is held closed even through float 37 drops due to decrease in liquid caused by vaporization.

When vessels 23 and 29 are connected through conduit 31 as described above, the high pressure in vessel 29 is communicated to vessel 23. This pressure causes liquid in vessel 23 to be diplaced from the bottom of this vessel through conduit 28 into the header 18 of the elevated evaporator. As the liquid level falls in vessel 23 during what may be generally termed the transfer period, float 38 descends until it operates the snap action leverage to open valves 25 and 27 and close valve 30. As float 38 descends, it actually only sets the valve operating mechanism 39 so that valves 25 and 27 may open when the pressure in vessel 23 is relieved to the system through conduit 28. During periods of high pressure in vessel 29, check valve 35 prevents flow of liquid out of this vessel. At the end of each transfer period, when valves 25 and 27 open, vessel 23 is vented through conduit 26 so that a filling period starts.

During the time that the pressure in vessel 23 is relieved due to flowing of liquid out of conduit 28, valve 30 is still open so that the pressure in vessel 29 is also temporarily relieved. This permits valve 32 to open in case float 37 is down. When valve 32 is open, liquid is replenished in vessel 29 through conduit 34, raising float 37 to again close valve 32. Conduit 26 and valve 27 provide a vent for vessel 23 during the time that liquid is flowing into this vessel. Valve 30 being closed, vessel 29 is cut off from the system when valve 32 closes so that pressure builds up in vessel 29 to be available for the next transfer period.

Various changes and modifications may be made within the scope of the invention as set forth in the following claims.

What is claimed is:

1. A system for effecting cooling at an elevation above a source of refrigeration including an evaporator at the upper elevation, a condenser arranged to be cooled by said source of refrigeration, a conduit for vapor from said evaporator to said condenser, a vessel connected to receive liquid condensate from said condenser and deliver the liquid condensate to said evaporator when the pressure in said vessel is increased sufficiently to force the liquid therefrom upward to said evaporator, a second vessel connected to receive liquid condensate from said condenser, a conduit for vapor from said second vessel into said first vessel, valve mechanism in said first vessel operative responsive to level of liquid therein to control communication between said vessels, and valve mechanism in said second vessel to control admission of liquid thereinto.

2. In apparatus of the character described, a transfer vessel, a heated chamber, a conduit for vapor from said chamber to said vessel, conduits for separately conducting liquid to said vessel and to said chamber, a first float operated valve mechanism for controlling entrance of liquid and vapor into said vessel, and a second independent float operated valve mechanism for controlling entrance of liquid to said heated chamber.

3. In apparatus of the character described, a transfer vessel from which liquid is displaced to a higher elevation when the pressure in said vessel is raised to the necessary value, a heated chamber connected to supply vapor for increasing the pressure in said vessel, and valve mechanism for preventing flow of vapor from said heated chamber to said vessel and prevent increase of pressure in said vessel except during a period in which liquid is forced from said vessel.

HENRY A. BURGGRABE.